(12) United States Patent
Xiao

(10) Patent No.: US 8,485,659 B2
(45) Date of Patent: Jul. 16, 2013

(54) RIM-LOCKER FOR SPECTACLE FRAME

(76) Inventor: Tony Xin Xiao, Chino, CA (US)

( * ) Notice: Subject to any disclaimer, the term of this patent is extended or adjusted under 35 U.S.C. 154(b) by 30 days.

(21) Appl. No.: 13/136,579

(22) Filed: Aug. 3, 2011

(65) Prior Publication Data

US 2012/0257160 A1      Oct. 11, 2012

Related U.S. Application Data

(60) Provisional application No. 61/516,806, filed on Apr. 8, 2011.

(51) Int. Cl.
*G02C 5/00* (2006.01)
*G02C 1/08* (2006.01)

(52) U.S. Cl.
USPC ........... 351/141; 351/140; 351/145; 351/146; 351/147; 351/148; 351/149; 351/90; 351/95; 351/96; 351/97; 351/99; 351/100; 351/101

(58) Field of Classification Search
USPC .................. 351/140–141, 145–149, 90–102
See application file for complete search history.

(56) References Cited

U.S. PATENT DOCUMENTS

2006/0164594 A1* 7/2006 Xiao .............................. 351/141
2009/0135370 A1* 5/2009 Xiao .............................. 351/140

\* cited by examiner

*Primary Examiner* — Scott J Sugarman
*Assistant Examiner* — Robert E Tallman
(74) *Attorney, Agent, or Firm* — Raymond Y. Chan; David and Raymond Patent Firm

(57) ABSTRACT

A rim locker for spectacle frame comprises a first portion and a second portion which are connected to two edges of lens rim in cut-off position respectively. The second portion has a screw hole for inserting a screw and the first portion is having thread to let the screw in for fastening the lens rim. The screw further has a stopping cap and the first portion further has a cylinder housing for hiding and moving the stopping cap, so that when the rim-locker is opening, the stopping cap will moving along the track of the housing, and stop at the end to prevent the screw slip off from the rim-locker and protect the screw threads not strip off easily.

15 Claims, 9 Drawing Sheets

RIM-LOCKER FOR SPECTACLE FRAME

CROSS REFERENCE OF RELATED APPLICATION

This is a non-provisional application that claims the benefit of priority under 35 U.S.C. §119 to a provisional application, application No. 61/516,806, filed Apr. 8, 2011.

BACKGROUND OF THE PRESENT INVENTION

1. Field of Invention

The present invention relates to an apparatus which can be used in spectacle frames for locking lenses, and more particularly to a rim-locker which includes a first portion, a second portion and a fastening element which adhere to the spectacle frame and never slips off from the spectacle frame at all time.

2. Description of Related Arts

A rim lock is one of very common components being used in spectacle frames today. For many years, a conventional rim locker is a simple design with a screw connecting between an upper portion and a lower portion of rim locker. The upper portion works as a nut that, when the screw is being tighten up, the lower portion comes close to the upper portion, so as to effectively lock the lens in the rim. But when the rim lock is opening, the screw is easy to slip off because there is nothing to limit or prevent the screw not to do so. Doctors or opticians sometime may upset about dropping a screw to the place that difficult to find. On the other hand, the optician may need to remove or replace the lenses several times before the work done when dispensing. It increases possibility to misplace the thread of the screw to the thread of the upper portion, causing stripped on the component, so that the frame becomes defective. In order to solve these problems, the present invention creates a new method as recited below.

SUMMARY OF THE PRESENT INVENTION

An object of the present invention is to provide a rim-locker which the screw having a stopping cap for preventing the screw slipping off or the screw threads stripping off when the glasses dispensing.

Another object of the present invention is to provide a rim-locker which the upper portion having a cylinder housing, so that when the rim-locker is opening, the stopping cap is able to move along the track of the housing, and when the rim-locker is in closed position, the stopping cap is hiding inside the housing.

Additional advantages and features of the invention will become apparent from the description which follows, and may be realized by means of the instrumentalities and combinations particular point out in the appended claims.

According to the present invention, the foregoing and other objects and advantages are attained by a rim-locker for spectacle frame, comprising a first portion and a second portion provided at one end of a rim of the spectacle frame at which a cut-off position is defined at the end of the rim; and a fastening element connecting between the first portion and the second portion, arranged for holding and locking the rim at the end of the rim into position at a close position through fastening the first portion and the second portion; and releasing and unlocking the rim at the end of the rim at a open position through unfastening the first portion with respect to the second portion, wherein the fastening element is capable of retaining and fastening the first portion and the second portion in such a manner that the fastening element stays connected to the rim through connecting to the first portion and the second portion of the rim-locker at the open position and the close position, thereby the fastening element does not slip off from the rim-locker even when the first portion is unfastened with respect to the second portion in the open position.

Preferably, the first portion has an inner connecting channel through which inner connecting threads are provided, the second portion has a hole coaxially aligned with the inner connecting channel and communicated through the inner connecting channel, and the fastening element is connected to the second portion through the hole of the second portion and to the first portion through connecting with the threads of the first portion, wherein the fastening element has a head portion which is bigger than an opening of the hole of the second portion, a body portion at least partially connected to the threads of the first portion, and a stopping cap which is bigger than an opening of the inner connecting channel, thereby the second portion stays connecting between the first portion and the fastening element through the head portion, while the first portion stays connecting with the second portion through the stopping cap of the fastening element, and the fastening stays connecting with the first portion and the second portion through the stopping cap and the head portion respectively.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
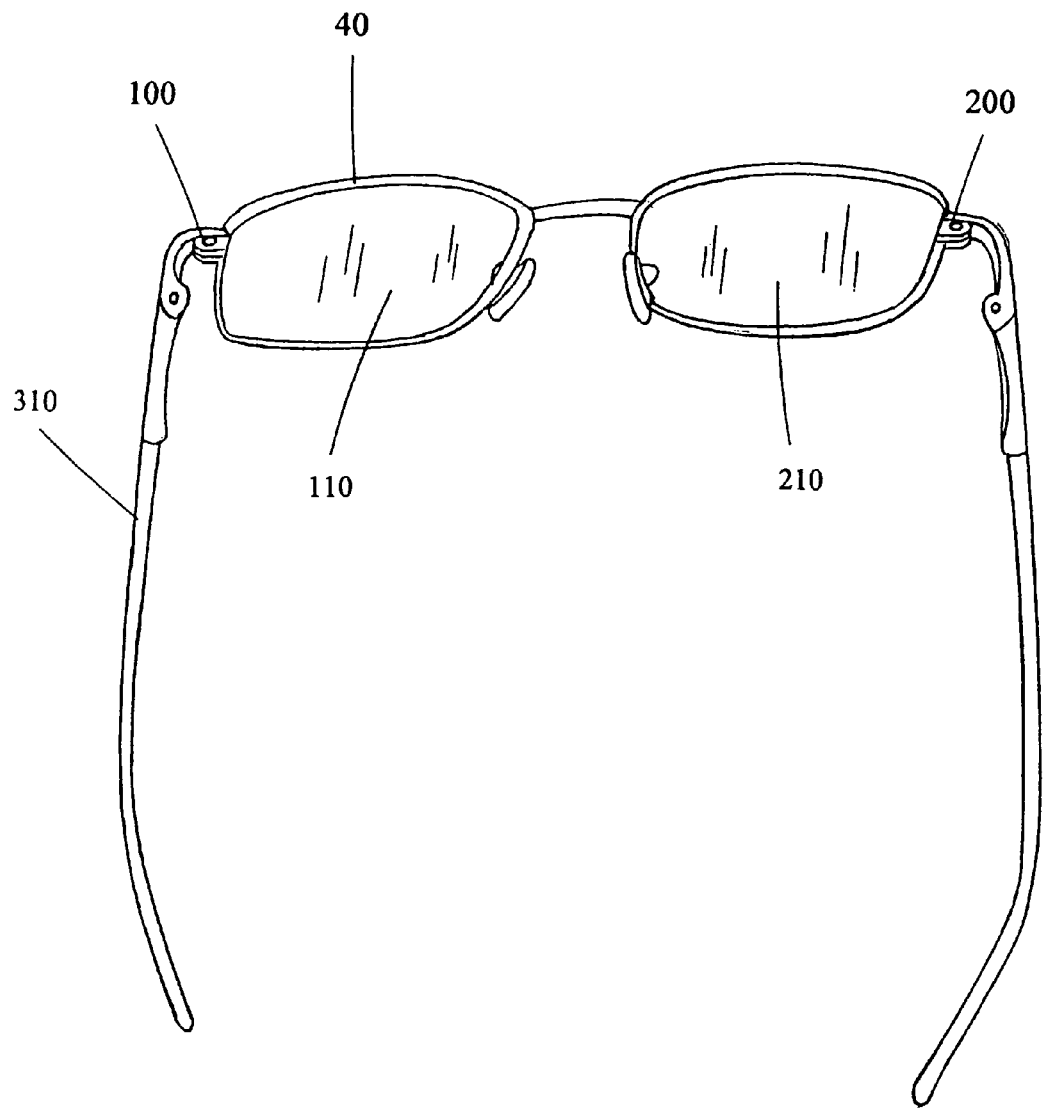
FIG. 1 is a rear perspective view of a spectacle frame according to a preferred embodiment of the present invention.
Figure 2:
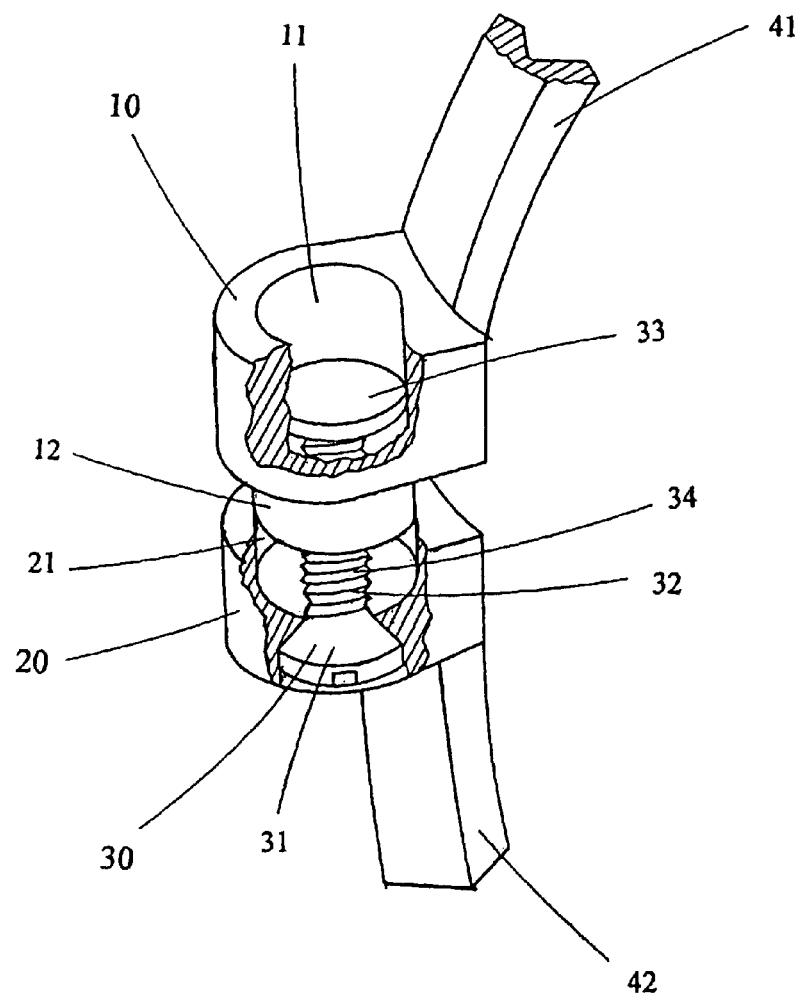
FIG. 2 is an exploded perspective view of the partial frame according to the preferred embodiment of the present invention.
Figure 3:
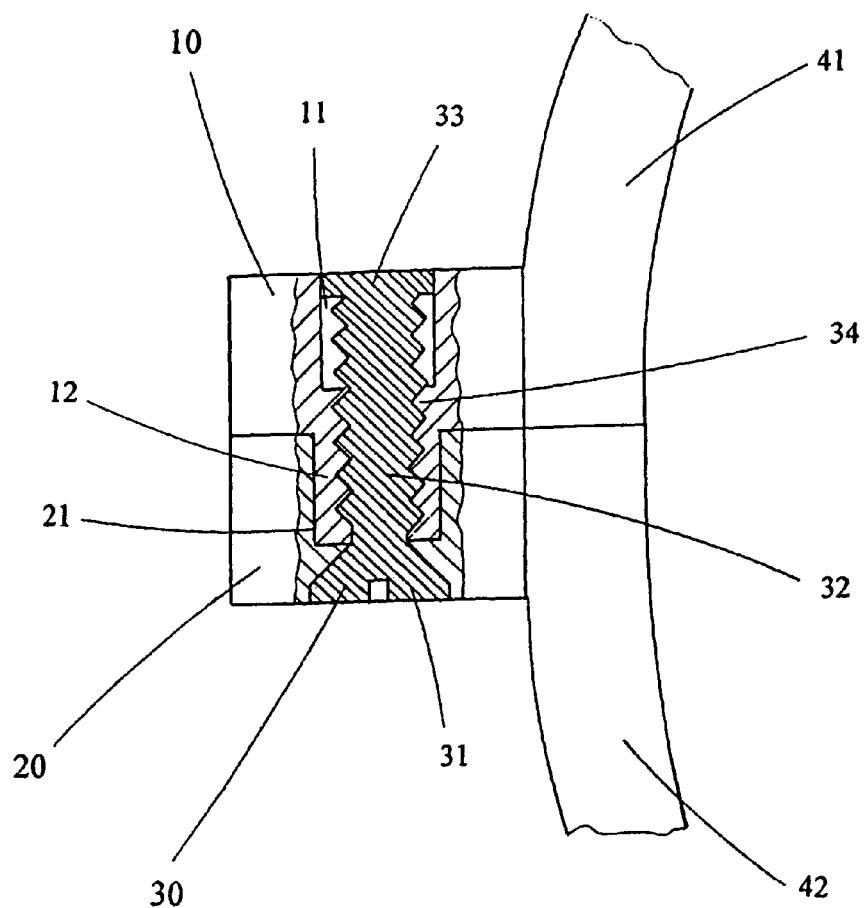
FIG. 3 is a sectional view of the partial frame according to the preferred embodiment of the present invention.
Figure 4:
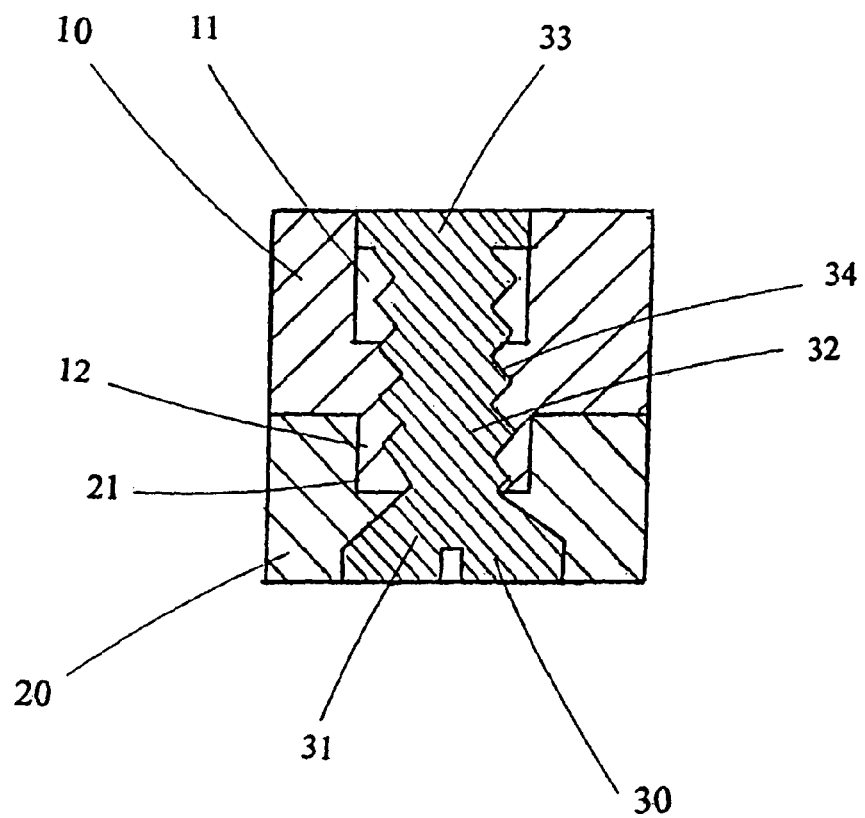
FIG. 4 is a sectional view of the rim-locker which the rim-locker is in closed position according to the preferred embodiment of the present invention.
Figure 5:
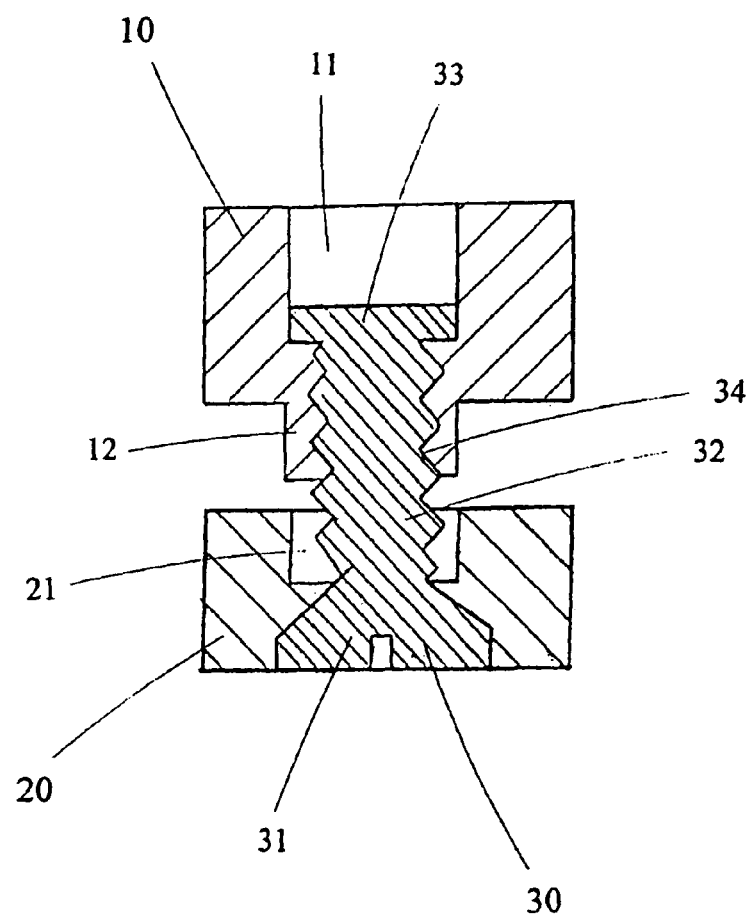
FIG. 5 is a sectional view of the rim-locker which the rim-locker is in open position according to the preferred embodiment of the present invention.

Referring to FIGS. 1, 2 and 3 of the drawings, a spectacle frame comprises a pair of rim-locker 100, 200 for locking a pair of lens 110, 210 in position, wherein each rim-locker includes a first portion 10 and a second portion 20, which are connected to one end of the upper rim 41 while another end of the lower rim 42 in cut-off position respectively, wherein an end-piece 300 is connected to the outer side of the first portion 10 of the rims-locker 100 and extended rearwardly for coupling with a temple 310.

According to FIGS. 2, 3, 4 and 5, the screw 30 has been inserted into the second portion 20 and connected to the first portion 10. The first portion 10 has threads 13 that work as a bolt nut. When the screw is being tied in, the second portion 20 comes close to the first portion 10, so as to effectively lock the lens in the rim 40. The first portion 10 further has a cylinder housing 11 on the upper side of its portion and a cylinder protrusion 12 in the bottom of its portion, and the second portion 20 has a cylinder housing 21 on its upper side for corresponding size and shape to the cylinder protrusion 12 when the rim-locker is in closed position. On the other hand, the screw 30 comprises screw head 31, screw body 32 with threads and screw stopping cap 33. And the diameter of the stopping cap 33 is slightly smaller than the diameter of the cylinder housing 11, so that when the rim-locker is in closed position, the stopping cap 33 is hiding inside of the cylinder housing 11. When the rim-locker is opening, the stopping cap 33 will be moving along the track of the cylinder housing 11 and stop at the end of the cylinder housing, so as to prevent the screw 30 slip off from the rim-locker. In addition, the advantage of this design is not only prevent the screw 30 slid off from the rim-locker, but also prolong the durability of the thread between the screw 30 and the first portion 10 and prevent the thread stripping off when the rim-locker is opened and closed repeatedly.

Figure 8:
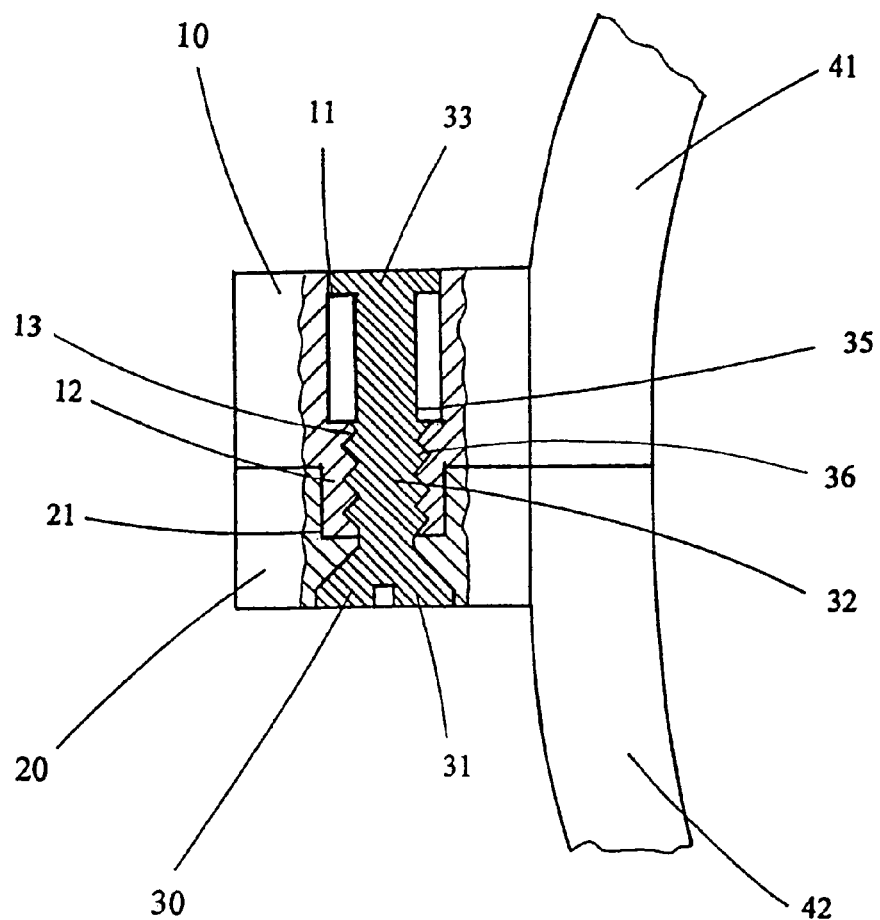
FIG. 8 is a sectional view of the rim-locker indicating the screw body has two parts which in close position according to the preferred embodiment of the present invention.
Figure 9:
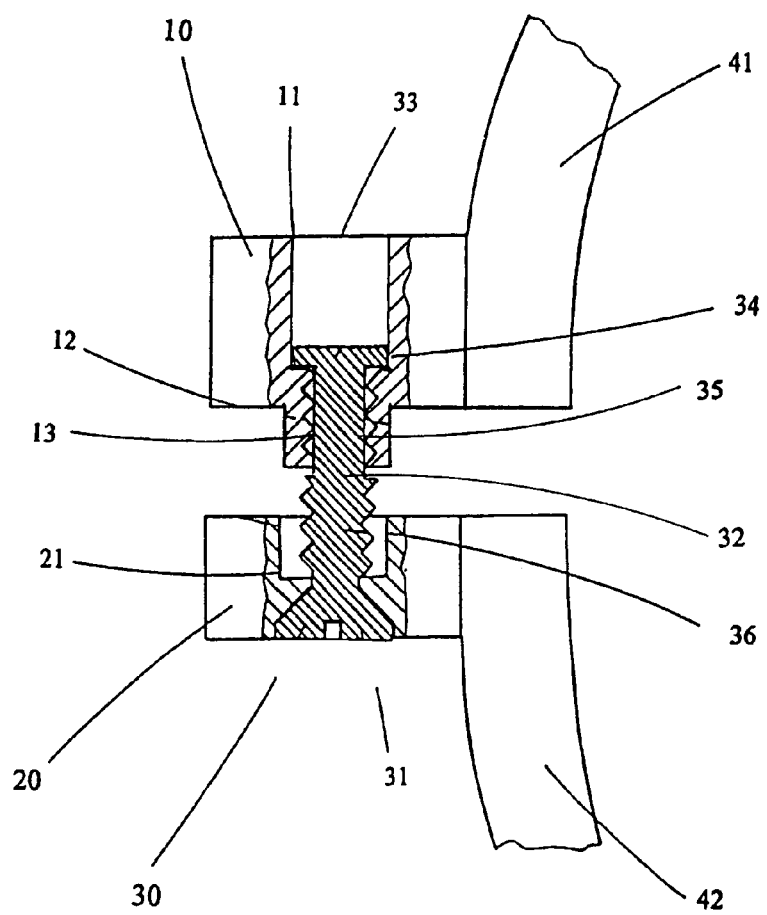
FIG. 9 is a sectional view of the rim-locker indicating the screw body has two parts which in opening position according to the preferred embodiment of the present invention.

Further more, referring to FIGS. 8 and 9 of the drawings, the screw body 32 has a smooth body 35 and has a thread body 36. When screw 30 rotates in rim-locker opening direction, the screw stopping cap moves along the track of the cylinder housing until reach to the end of the cylinder housing. As the screw continues to rotate, the thread body 36 detach from the threads 13 of the first portion 10 of the rim-locker and the smooth body 35 works as a bearing inside the first portion of the rim-locker 10, so that the stopping cap stop to move, but it continues spin as the screw rotates continually. The advantage of this design is no matter how hard the optician to turn the screw, the screw still connected between the first portion and the second portion of the rim-locker, and the screw stopping cap will be never broken, so as to create so-called zero defective rim-locker.

Figure 6:
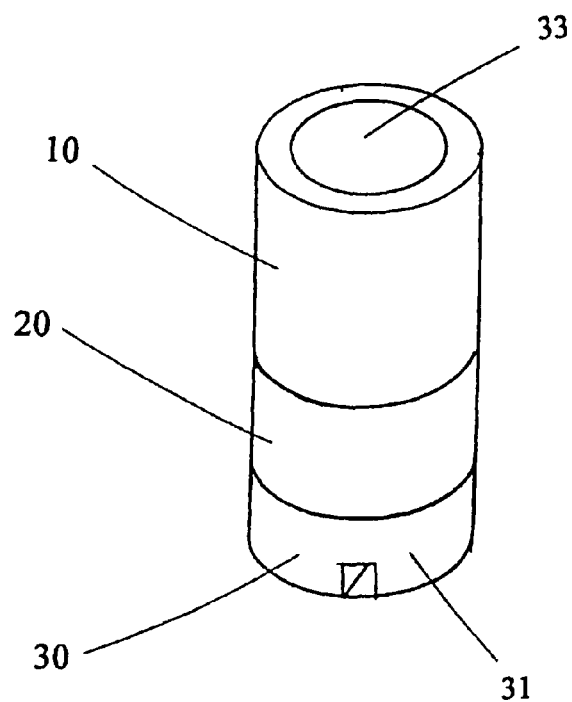
FIG. 6 is a perspective view of the other rim-locker according to the preferred embodiment of the present invention.
Figure 7:
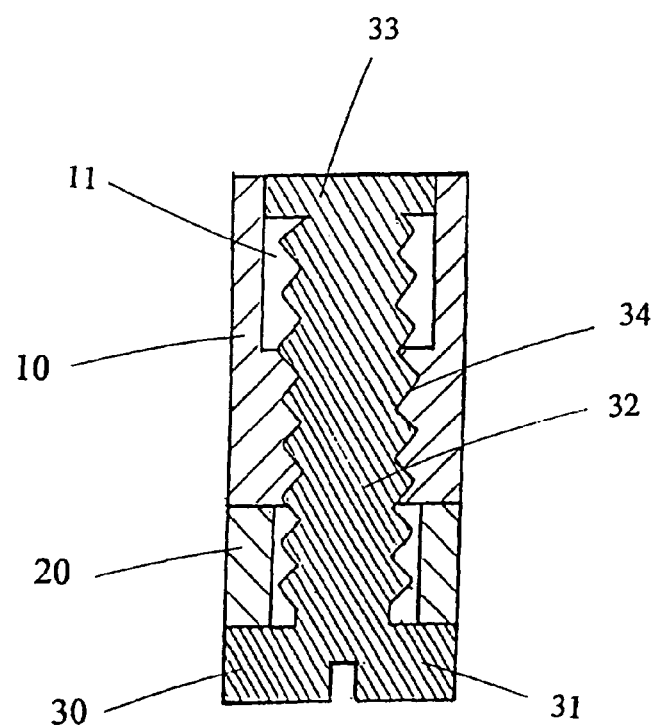
FIG. 7 is a sectional view of the other rim-locker according to the preferred embodiment of the present invention.

Referring to FIGS. 6 and 7 of the drawings, the rim-locker is in a cylinder shape. The first portion 10 has a cylinder housing 11 but does not has a cylinder protrusion, and also the second portion 20 does not has a corresponding housing for the cylinder protrusion. This is an alternative design but also work well as previous design.

It is important to know that the cylinder housing can be changed in variable shapes and the stopping cap that corresponding to the cylinder housing can be changed in variable shapes as well. There is another thing that cannot be neglected that the rim-locker can be located in any cut-off positions of the lens rim rather than concealed behind the end-piece as mentioned previously.

While the present invention has been described in certain levels of profundity, the above preferred embodiment is for purposes of the disclosure only, wherein various changes in the detailed construction and arrangement of parts can be made by those skills in the art. However, it is to be understood that such changes are within the spirit and scope of the present invention, as defined by the following claims.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rim-locker for spectacle frame, comprising a first portion and a second portion which are connected to one of two ends of a rim in cut-off position respectively, a screw being connected between said first portion and said second portion for holding and locking said rim in position, said first portion having threads and said second portion having a hole, said screw including a screw head, a screw body and a screw stopping cap, wherein said screw head is bigger than said hole of said second portion and said screw stopping cap is bigger than said threads of said first portion, thereby no matter said rim-locker is in open position, close position or any other positions, said screw is always connected to said first portion and said second portion of said rim-locker never slip off from said rim-locker.

2. The rim-locker, as recited in claim 1, wherein said first portion further has a cylinder housing on top of said first portion and said screw stopping cap has size and shape corresponding to said cylinder housing, wherein when said rim-locker is in closed position, said screw stopping cap is hiding inside said cylinder housing, and when said rim-locker is opening, said screw stopping cap moves along the track of said cylinder housing and stops at the end of said cylinder housing, so as to prevent said screw slip off from said rim-locker.

3. The rim-locker, as recited in claim 2, wherein said first portion further has a cylinder protrusion on bottom of said first portion and said second portion further has a cylinder housing with corresponding size and shape to said cylinder protrusion, wherein when said rim-locker is in closed position, said cylinder protrusion hides inside said cylinder housing of said second portion, so as to save room for making said rim-locker smaller.

4. The rim-locker, as recited in claim 2, wherein said screw body has threads in entire body, wherein when said rim-locker is opening, said screw stopping cap moves along the track of said cylinder housing and stops at the end of said cylinder housing, so as to prevent said screw slip off from said rim-locker.

5. The rim-locker, as recited in claim 2, wherein said screw body includes a smooth body and a thread body, wherein when said screw rotates in said rim-locker opening direction, said screw stopping cap moves along the track of said cylinder housing until reach to the end of said cylinder housing, but it continues to spin as said screw rotates continually, so as to prevent said screw stopping cap broken and avoid said screw slip off from said rim-locker.

6. A screw connected through hole between a first portion and a second portion of rim-locker together to hold and lock the rim in position, comprising a screw head, a screw body and a screw stopping cap, wherein said screw body having a smooth body and a thread body, wherein said first portion having a cylinder housing and having threads in said hole of said first portion, wherein said screw head is bigger than said hole of said second portion and said screw stopping cap is slightly smaller than said cylinder housing of said first portion, thereby when said screw rotates in said rim-locker opening direction, said screw moves along the track of said threads of said first portion and stops at when reaches to said smooth portion of said screw, wherein said screw stopping cap rotate freely when said screw rotates continually, so as to prevent said screw stopping cap breaking off.

7. A rim-locker for spectacle frame, comprising:
a first portion and a second portion provided at one end of a rim of the spectacle frame at which a cut-off position is defined at said end of said rim; and
a fastening element connecting between said first portion and said second portion, arranged for holding and locking the rim at said end of said rim into position at a close position through fastening said first portion and said second portion; and releasing and unlocking the rim at said end of said rim at a open position through unfastening said first portion with respect to said second portion, wherein said fastening element is capable of retaining and fastening said first portion and said second portion in such a manner that said fastening element stays connected to said rim through connecting to said first portion and said second portion of said rim-locker at the open position and the close position, thereby said fastening element does not slip off from said rim-locker even when said first portion is unfastened with respect to said second portion in the open position, wherein said first portion has an inner connecting channel through which inner connecting threads are provided, said second portion has a hole coaxially aligned with said inner connecting channel and communicated through said inner connecting channel, and said fastening element is connected to said second portion through said hole of said second portion and to said first portion through connecting with said threads of said first portion, wherein said fastening element has a head portion which is bigger than an opening of said hole of said second portion, a body portion at least partially connected to said threads of said first portion, and a stopping cap which is bigger than an opening of said inner connecting channel, thereby said second portion stays connecting between said first portion and said fastening element through said head portion, while said first portion stays connecting with said second portion through said stopping cap of said fastening element, and said fastening stays connecting with said first portion and said second portion through said stopping cap and said head portion respectively.

8. The rim-locker, as recited in claim 7, wherein said first portion has a cylinder housing which is sized to fit said stopping cap of said fastening element in such a manner that said stopping cap is fittingly received inside said housing and is invisible from outside at the close position, and said stopping cap is capable of sliding longitudinally along said cylinder housing and being stopped at an end of said cylinder housing at the open position such that said fastening element is interlocked with said first portion through said end of said cylinder housing, thereby said fastening element is prevented from slipping off from said first portion.

9. The rim-locker, as recited in claim 8, wherein said first portion has a cylinder protrusion outwardly extended from said end of said cylinder housing, and said second portion has a cylinder housing which is sized and shaped to fit and connect to said cylinder protrusion in such a manner that said cylinder protrusion is received inside through said cylinder housing of said second portion at the close position, thereby a size of said rim-locker can be reduced.

10. The rim-locker, as recited in claim 8, wherein said body portion of said fastening element is threaded throughout said body portion of said fastening element arranged for connecting to said threads of said first portion.

11. The rim-locker, as recited in claim 9, wherein said body portion of said fastening element is threaded throughout said body portion of said fastening element arranged for connecting to said threads of said first portion.

12. The rim-locker, as recited in claim 8, wherein said body portion of said fastening element is threaded partially at a position proximal to said head portion of said fastening element arranged for connecting to said threads of said first portion, thereby said stopping cap is protected from damage being caused by excess rotational movement of said fastening element when said fastening element is released to move from the close position to the open position.

13. The rim-locker, as recited in claim 9, wherein said body portion of said fastening element is threaded partially at a position proximal to said head portion of said fastening element arranged for connecting to said threads of said first portion, thereby said stopping cap is protected from damage being caused by excess rotational movement of said fastening element when said fastening element is released to move from the close position to the open position.

14. The rim-locker, as recited in claim 11, wherein said fastening element is a screw.

15. The rim-locker, as recited in claim 13, wherein said fastening element is a screw.

\* \* \* \* \*